(12) United States Patent
Sammons (10) Patent No.: US 11,000,158 B2
(45) Date of Patent: May 11, 2021

(54) BEVERAGE MIXING ASSEMBLY

(71) Applicant: Jonathan Sammons, Athens, GA (US)

(72) Inventor: Jonathan Sammons, Athens, GA (US)

( * ) Notice: Subject to any disclaimer, the term of this patent is extended or adjusted under 35 U.S.C. 154(b) by 380 days.

(21) Appl. No.: 16/032,580

(22) Filed: Jul. 11, 2018

(65) Prior Publication Data
US 2020/0015630 A1    Jan. 16, 2020

(51) Int. Cl.
| | |
|---|---|
| *A47J 43/044* | (2006.01) |
| *B01F 15/00* | (2006.01) |
| *B01F 13/00* | (2006.01) |
| *A47J 43/07* | (2006.01) |
| *B01F 7/16* | (2006.01) |
| *A47J 43/27* | (2006.01) |

(52) U.S. Cl.
CPC .......... *A47J 43/044* (2013.01); *B01F 13/002* (2013.01); *B01F 15/00006* (2013.01); *B01F 15/00519* (2013.01); *B01F 15/00967* (2013.01); *A47J 43/0705* (2013.01); *A47J 43/27* (2013.01); *A47J 2043/04436* (2013.01); *A47J 2043/04445* (2013.01); *B01F 7/161* (2013.01); *B01F 2215/0022* (2013.01)

(58) Field of Classification Search
CPC .................. A47J 43/044; A47J 43/0705; A47J 2043/04445; A47J 43/27; A47J 2043/04436; B01F 2215/0022; B01F 7/161; B01F 15/00519; B01F 13/002; B01F 15/00006; B01F 15/00967
See application file for complete search history.

(56) References Cited

U.S. PATENT DOCUMENTS

| | | | | |
|---|---|---|---|---|
| 1,496,611 A | * | 6/1924 | Siegel ................... | A47J 43/044 366/207 |
| 1,779,018 A | * | 10/1930 | Smallwood ............ | B44D 3/121 206/15.3 |
| 2,026,240 A | | 12/1935 | Luxmore | |
| 3,357,429 A | * | 12/1967 | Folkman ............... | A61F 5/4405 604/324 |
| 4,382,200 A | * | 5/1983 | Street ..................... | A47J 43/044 310/157 |
| 4,480,926 A | | 11/1984 | Lattery, Jr. | |
| 4,721,390 A | * | 1/1988 | Lidgren ................ | B01F 7/1695 366/139 |
| 4,738,542 A | * | 4/1988 | Hung .................... | A47J 43/044 366/244 |

(Continued)

FOREIGN PATENT DOCUMENTS

WO    WO0049929    8/2000

*Primary Examiner* — Tony G Soohoo (57) ABSTRACT

A beverage mixing assembly includes a gasket that is positioned around an open end of a beverage container. The gasket is comprised of a resiliently stretchable material for accommodating a variety of sizes of beverage containers. A housing is coupled to the gasket for gripping the housing and a motor is positioned within the housing. A shaft releasably engages the motor such that the motor rotates the shaft when the motor is turned on. The shaft extending downwardly into the beverage cup when the gasket is positioned around the open end of the beverage container. A mixer is coupled to the shaft such that the shaft rotates the mixer when the motor is turned on thereby facilitating the mixer to mix the beverage in the beverage container.

4 Claims, 6 Drawing Sheets

(56) References Cited

U.S. PATENT DOCUMENTS

| | | | |
|---|---|---|---|
| 4,872,764 A * | 10/1989 | McClean | A47J 43/044 |
| | | | 366/251 |
| 6,736,538 B2 | 5/2004 | Bittner | |
| 6,789,934 B1 * | 9/2004 | Goddard | B29C 33/10 |
| | | | 366/139 |
| 7,048,149 B1 | 5/2006 | Lassota | |
| 7,874,719 B2 * | 1/2011 | Markle | B01F 15/00006 |
| | | | 366/273 |
| 8,672,534 B2 | 3/2014 | Nevarez et al. | |
| 2008/0279040 A1 * | 11/2008 | Neilson | B01F 7/1605 |
| | | | 366/176.1 |

* cited by examiner

BEVERAGE MIXING ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to mixing devices and more particularly pertains to a new mixing device for mixing a beverage in a beverage container.

BRIEF SUMMARY OF THE INVENTION

An embodiment of the disclosure meets the needs presented above by generally comprising a gasket that is positioned around an open end of a beverage container. The gasket is comprised of a resiliently stretchable material for accommodating a variety of sizes of beverage containers. A housing is coupled to the gasket for gripping the housing and a motor is positioned within the housing. A shaft releasably engages the motor such that the motor rotates the shaft when the motor is turned on. The shaft extending downwardly into the beverage cup when the gasket is positioned around the open end of the beverage container. A mixer is coupled to the shaft such that the shaft rotates the mixer when the motor is turned on thereby facilitating the mixer to mix the beverage in the beverage container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
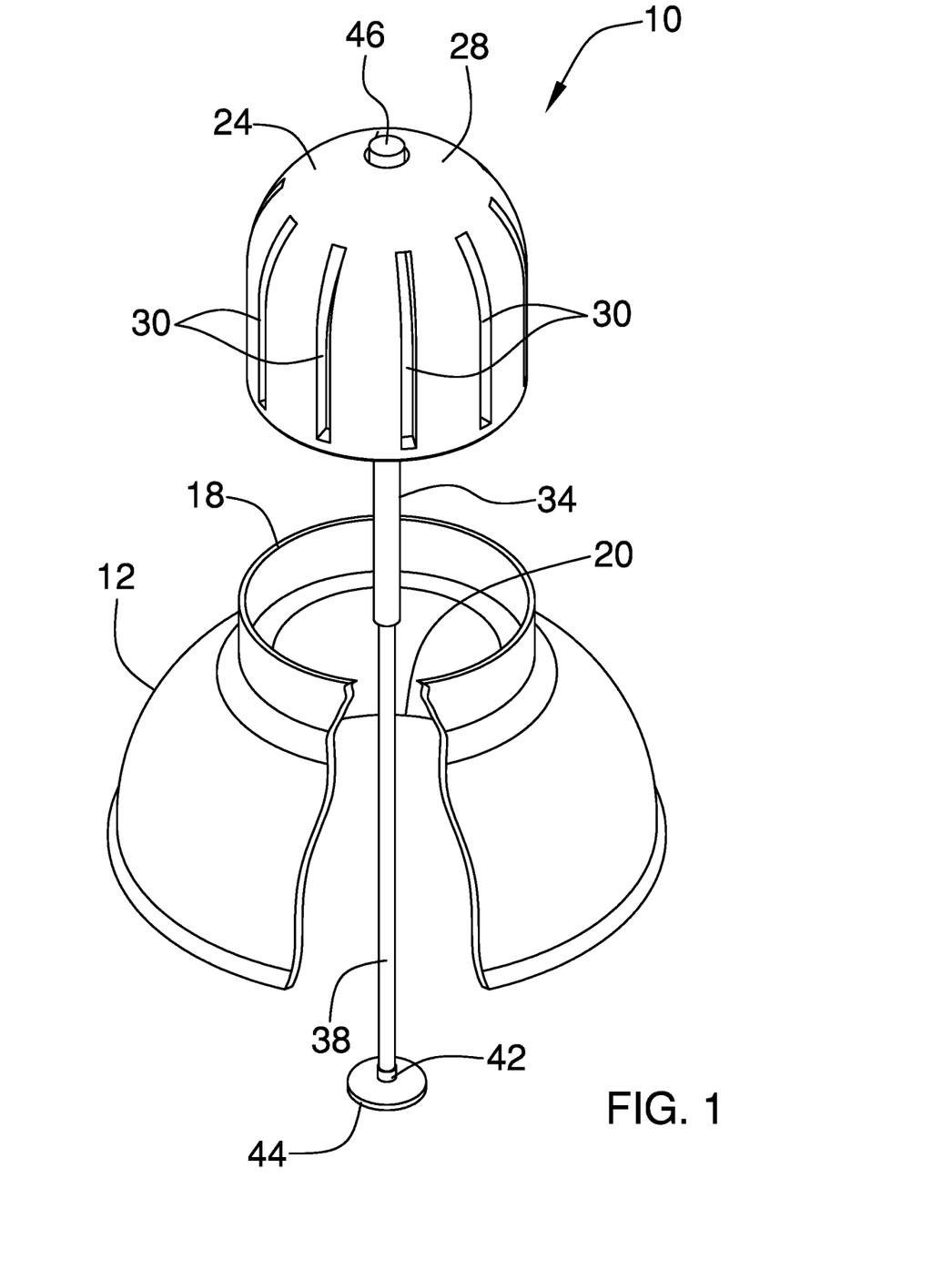
FIG. 1 is a perspective cut-away view of a beverage mixing assembly according to an embodiment of the disclosure.
Figure 2:
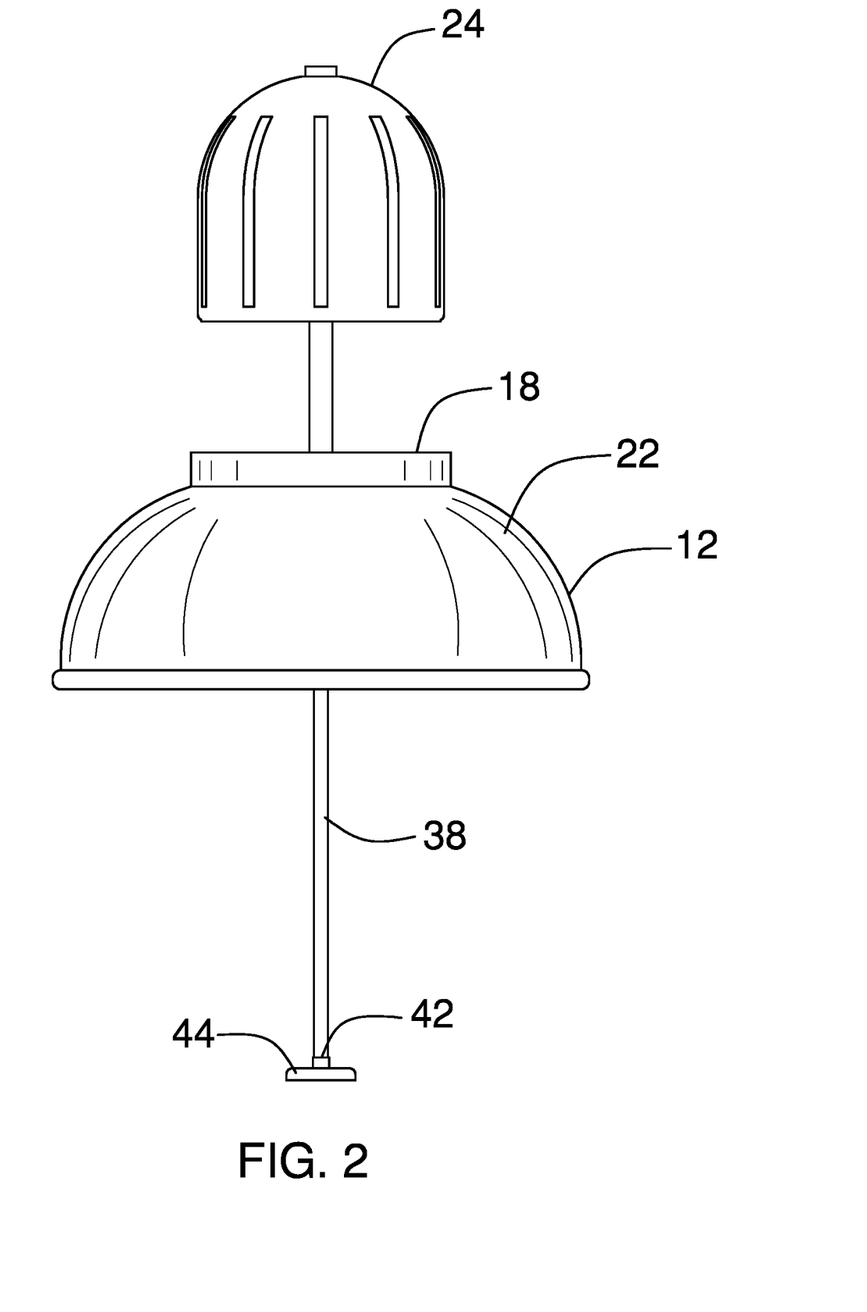
FIG. 2 is a front view of an embodiment of the disclosure.
Figure 3:
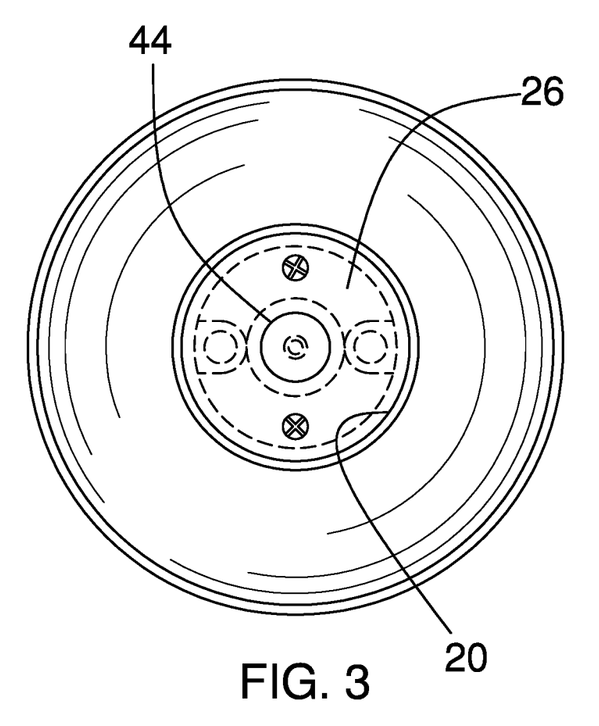
FIG. 3 is a bottom view of an embodiment of the disclosure.
Figure 4:
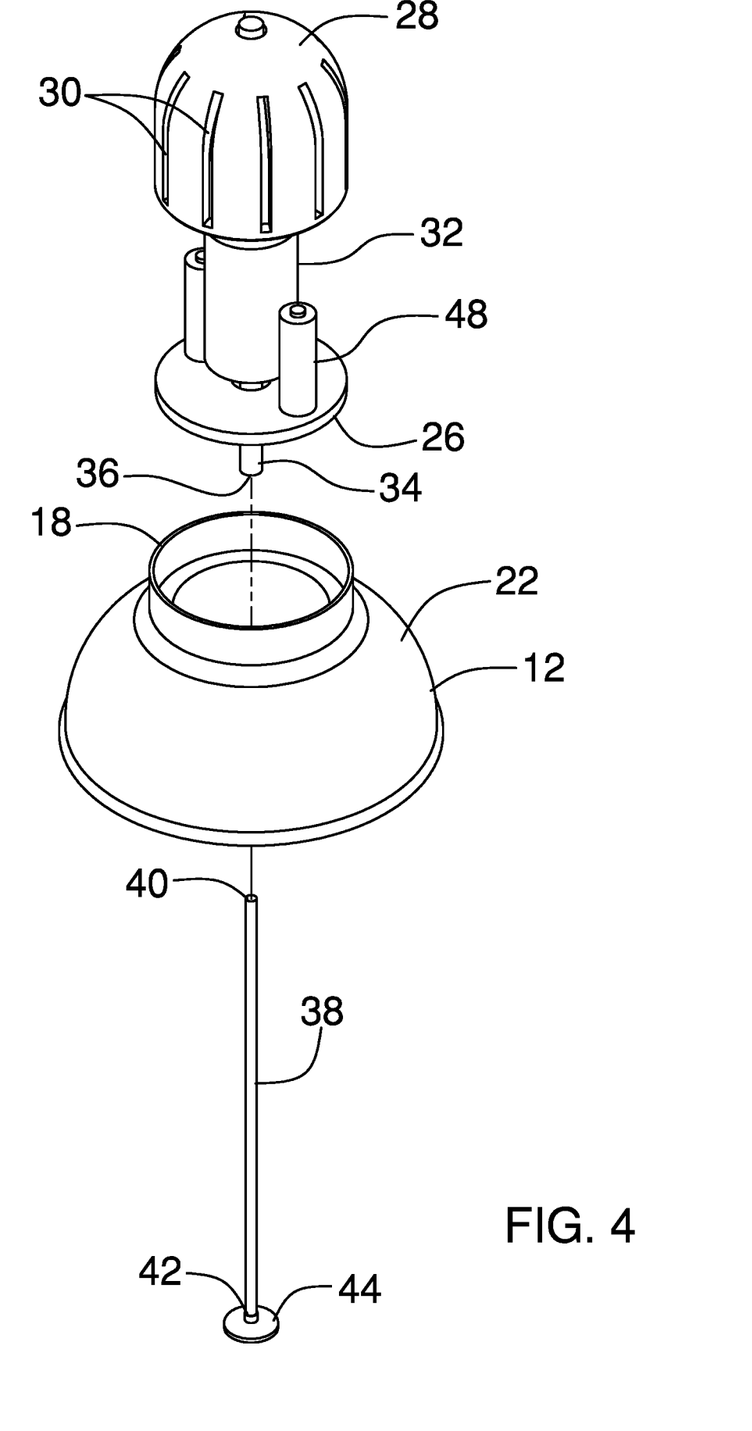
FIG. 4 is an exploded perspective view of an embodiment of the disclosure.
Figure 5:
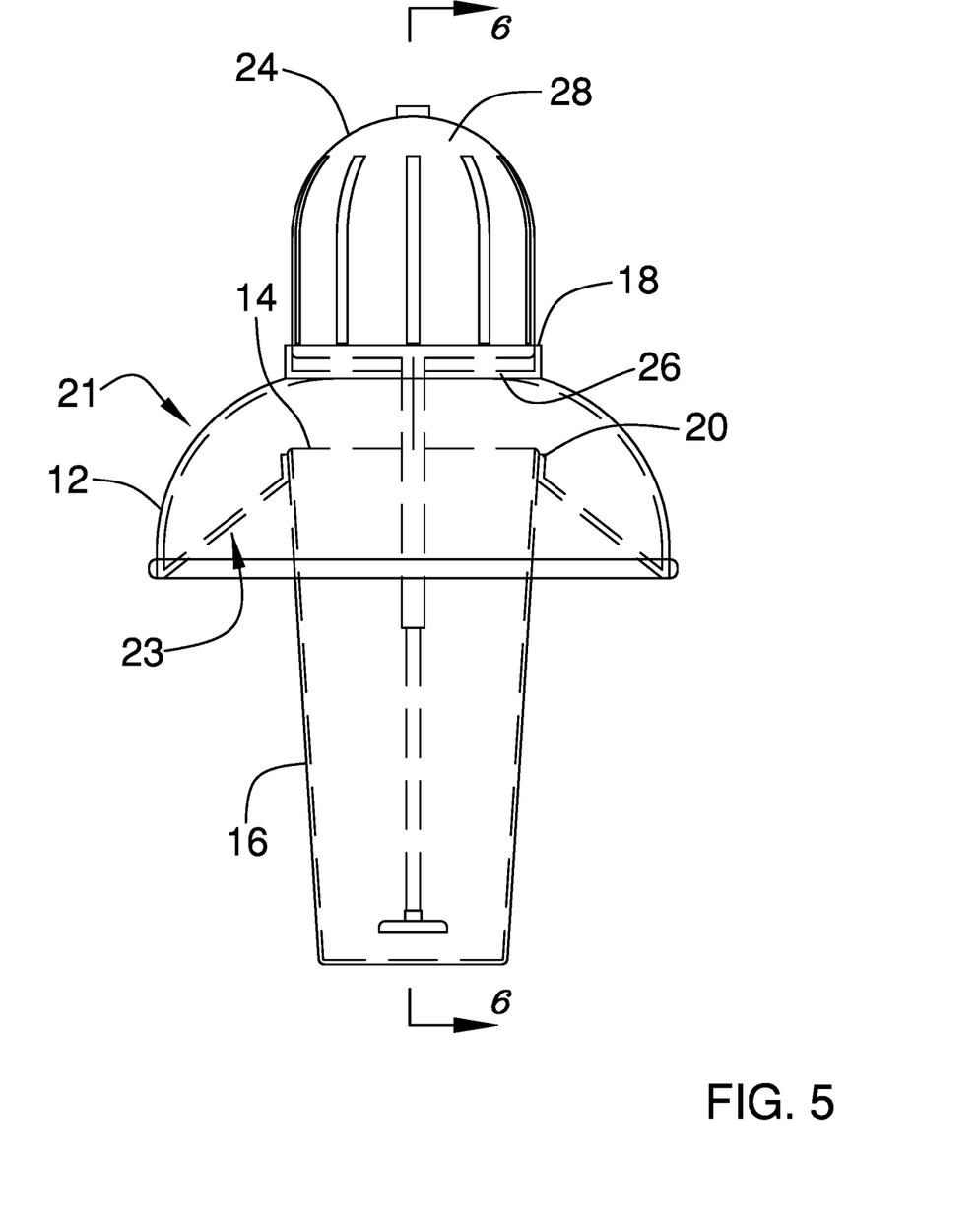
FIG. 5 is a phantom in-use view of an embodiment of the disclosure.
Figure 6:
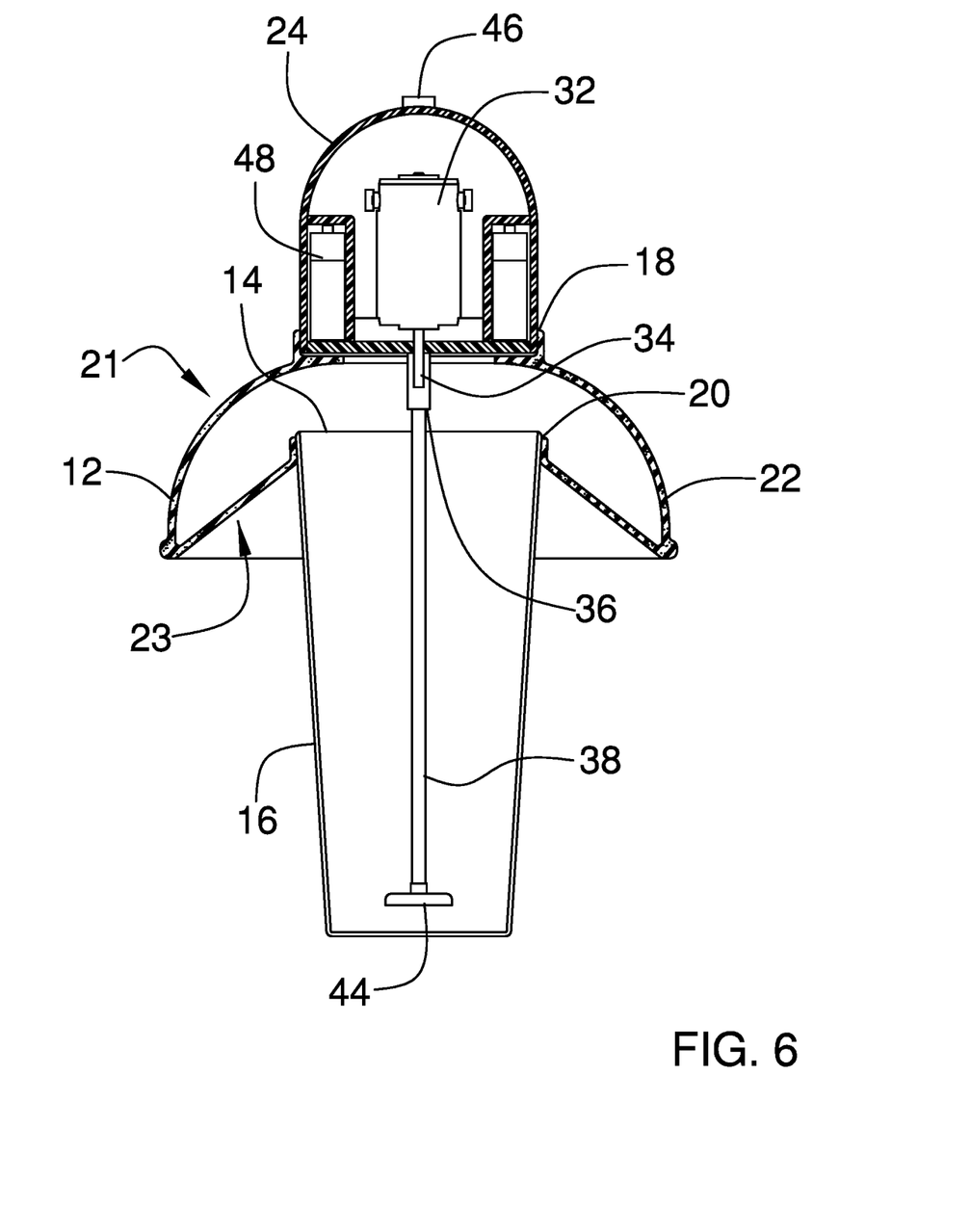
FIG. 6 is a cross sectional view taken along line 6-6 of FIG. 5 of an embodiment of the disclosure.

With reference now to the drawings, and in particular to FIGS. 1 through 6 thereof, a new mixing device embodying the principles and concepts of an embodiment of the disclosure and generally designated by the reference numeral 10 will be described.

As best illustrated in FIGS. 1 through 6, the beverage mixing assembly 10 generally comprises a gasket 12 that is positioned around an open end 14 of a beverage container 16. The beverage container 16 may be a drinking cup or other cylindrical container with an open end 14. The gasket 12 is comprised of a resiliently stretchable material, such as silicone, rubber or other food grade material, for accommodating a variety of sizes of beverage containers. Additionally, the gasket 12 forms a fluid impermeable seal with the beverage container 16.

The gasket 12 has a first end 18, a second end 20 and an outer wall 22 extending therebetween. Each of the first 18 and second 20 ends is open. The outer wall 22 has a first portion 21 and a second portion 23 and the first portion 21 is continuously arcuate such that the first portion 21 has a cylindrical shape. Moreover, the first portion flares outwardly between the first 18 end and second portion 23 such that the first portion 21 has a bell shape. The second portion 23 extends inwardly and upwardly from the first portion 21 such that the second end 20 is aligned with the first end 18. The second end 20 is stretchable around the open end 14 of the beverage container 16 such that the second end 20 tightens around the open end 14.

A housing 24 is coupled to the gasket 12 for gripping the housing 24 and the housing 24 has a basal wall 26 and a top wall 28 that is releasably coupled thereto. The top wall 28 is removable from the basal wall 26 to access an interior of the housing 24. Additionally, the top wall 28 is concavely arcuate with respect to the basal wall 26 such that the housing 24 has a dome shape. The first end 18 of the gasket 12 insertably receives the basal wall 26 of the housing 24. The top wall 28 has a plurality of vents 30 each extending into the interior of the housing 24 to pass air into the interior of the housing 24.

A motor 32 is positioned within the housing 24 and the motor 32 may be an electrical motor 32 or the like. A drive 34 is rotatably coupled to the motor 32 such that the motor 32 rotates the drive 34 when the motor 32 is turned on. The drive 34 extends downwardly through the basal wall 26 of the housing 24 and the drive 34 has a distal end 36 with respect to the motor 32. A shaft 38 releasably engages the motor 32 such that the motor 32 rotates the shaft 38 when the motor 32 is turned on. Moreover, the shaft 38 extends downwardly into the beverage container 16 when the gasket 12 is positioned around the open end 14 of the beverage container 16. The shaft 38 has a primary end 40 and a secondary end 42, and the primary end 40 releasably engages the distal end 36 of the drive 34.

A mixer 44 is coupled to the shaft 38 such that the shaft 38 rotates the mixer 44 when the motor 32 is turned on. In this way the mixer 44 can mix the beverage in the beverage container 16. The mixer 44 is coupled to the secondary end 42 of the shaft 38 such that the mixer 44 is submerged in the beverage when the gasket 12 is positioned on the open end 14 of the beverage container 16. The mixer 44 may comprise a plurality of blades, a disk or other mechanism that is common to electric beverage mixers. A switch 46 is coupled to the housing 24 and the switch 46 is electrically coupled to the motor 32 such that the switch 46 turns the motor 32 on and off. A power supply 48 is positioned within the housing 24, the power supply 48 is electrically coupled to the motor 32 and the power supply 48 comprises at least one battery.

In use, the shaft 38 is extended into the beverage container 16 and the gasket 12 is stretched around the open end 14 of the beverage cup. Thus, the mixer 44 is submerged in the beverage and the gasket 12 forms a fluid impermeable seal with the beverage cup. The switch 46 is manipulated to turn the motor 32 on and thusly mix the beverage on the beverage cup. The gasket 12 is removed from the beverage cup and the shaft 38 is drawn upwardly out of the beverage cup. In this way the beverage contained in any sort of beverage container 16 can be mixed with the mixer 44. The shaft 38 is removable from the drive 34 for storage or for cleaning.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A beverage mixing assembly being configured to be removably positioned on a beverage container for mixing a beverage contained therein, said assembly comprising:

a gasket being positioned around an open end of a beverage container, said gasket being comprised of a resiliently stretchable material for accommodating a variety of sizes of beverage containers, said gasket forming a fluid impermeable seal with the beverage container;

a housing being coupled to said gasket for gripping said housing;

a motor being positioned within said housing;

a shaft releasably engaging said motor such that said motor rotates said shaft when said motor is turned on, said shaft extending downwardly into the beverage cup when said gasket is positioned around the open end of the beverage container;

a mixer being coupled to said shaft such that said shaft rotates said mixer when said motor is turned on thereby facilitating said mixer to mix the beverage in the beverage container;

a switch being coupled to said housing, said switch being electrically coupled to said motor such that said switch turns said motor on and off;

said gasket having a first end, a second end and an outer wall extending therebetween, each of said first and second ends being open, said outer wall having a first portion and a second portion, said first portion being continuously arcuate such that said gasket has a cylindrical shape, said first portion of said outer wall flaring outwardly between said first end and said and second portion such that said first portion has a bell shape, said second portion extending upwardly and inwardly from said first portion such that said second end is aligned with said first end, said second end being stretched around the open end of the beverage container; and said housing having a basal wall and a top wall being releasably coupled thereto, said top wall being removable from said bottom wall to access an interior of said housing, said top wall being concavely arcuate with respect to said basal wall such that said housing has a dome shape, said first end of said gasket insertably receiving said basal wall of said housing, said top wall having a plurality of vents each extending into said interior of said housing wherein each of said vents is configured to pass air into said interior of said housing.

2. The assembly according to claim 1, further comprising:

a drive being rotatably coupled to said motor such that said motor rotates said drive when said motor is turned on, said drive extending downwardly through said basal wall of said housing, said drive having a distal end with respect to said motor;

said shaft having a primary end and a secondary end, primary end releasably engaging said distal end of said drive; and said mixer being coupled to said secondary end of said shaft such that said mixer is submerged in the beverage when said gasket is positioned on the open end of the beverage container.

3. The assembly according to claim 1, further comprising a power supply being positioned within said housing, said power supply being electrically coupled to said motor, said power supply comprising at least one battery.

4. A beverage mixing assembly being configured to be removably positioned on a beverage container for mixing a beverage contained therein, said assembly comprising:

a gasket being positioned around an open end of a beverage container, said gasket being comprised of a resiliently stretchable material for accommodating a variety of sizes of beverage containers, said gasket forming a fluid impermeable seal with the beverage container, said gasket has a first end, a second end and an outer wall extending therebetween, each of said first and second ends being open, said outer wall having a first portion and a second portion, said first portion being continuously arcuate such that said gasket has a cylindrical shape, said first portion of said outer wall flaring outwardly between said first end and said and second portion such that said first portion has a bell shape, said second portion extending upwardly and inwardly from said first portion such that said second end is aligned with said first end, said second end being stretched around the open end of the beverage container;

a housing being coupled to said gasket for gripping said housing, said housing having a basal wall and a top wall being releasably coupled thereto, said top wall being removable from said bottom wall to access an interior of said housing, said top wall being concavely arcuate with respect to said basal wall such that said housing has a dome shape, said first end of said gasket insertably receiving said basal wall of said housing, said top wall having a plurality of vents each extending into said interior of said housing wherein each of said vents is configured to pass air into said interior of said housing;

a motor being positioned within said housing;

a drive being rotatably coupled to said motor such that said motor rotates said drive when said motor is turned on, said drive extending downwardly through said basal wall of said housing, said drive having a distal end with respect to said motor;

a shaft releasably engaging said motor such that said motor rotates said shaft when said motor is turned on, said shaft extending downwardly into the beverage cup when said gasket is positioned around the open end of the beverage container, said shaft having a primary end and a secondary end, primary end releasably engaging said distal end of said drive;

a mixer being coupled to said shaft such that said shaft rotates said mixer when said motor is turned on thereby facilitating said mixer to mix the beverage in the beverage container, said mixer being coupled to said secondary end of said shaft such that said mixer is submerged in the beverage when said gasket is positioned on the open end of the beverage container;

a switch being coupled to said housing, said switch being electrically coupled to said motor such that said switch turns said motor on and off; and a power supply being positioned within said housing, said power supply being electrically coupled to said motor, said power supply comprising at least one battery.

* * * * *